Figure 1:
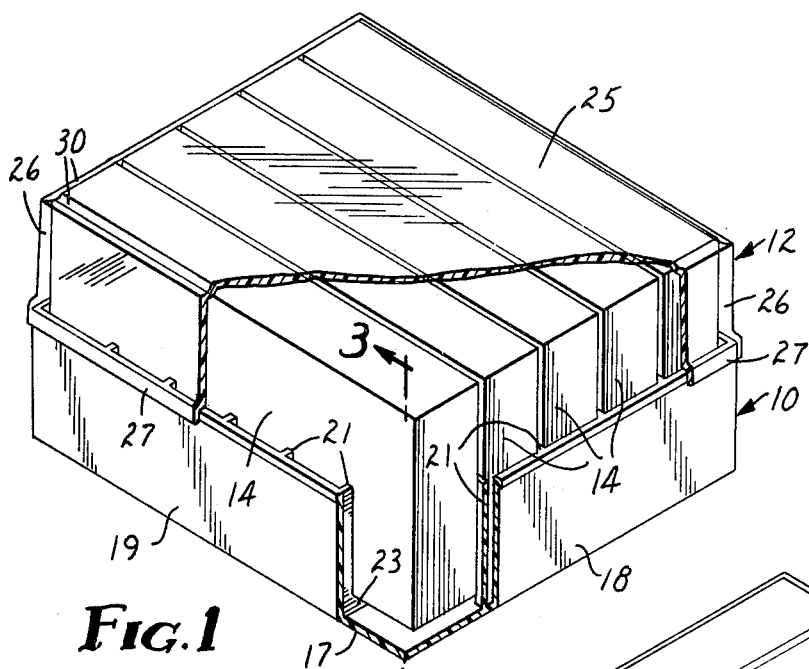

United States Patent [19]

Larson et al.

[11] 4,201,298
[45] May 6, 1980

[54] STORAGE CASE

[75] Inventors: Donald A. Larson, Circle Pines, Minn.; Theodore J. Reichert, Turtle Lake, Wis.

[73] Assignee: Hartzell Manufacturing, Inc., St. Paul, Minn.

[21] Appl. No.: 11,799

[22] Filed: Feb. 14, 1979

[51] Int. Cl.² .............................................. B65D 85/30
[52] U.S. Cl. ..................................... 206/387; 206/526
[58] Field of Search .................. 206/45.34, 386–387, 206/455–456, 511–512, 526; 220/20; 312/10, 117

[56] References Cited

U.S. PATENT DOCUMENTS

| | | | |
|---|---|---|---|
| 3,480,178 | 11/1969 | Morgan | 206/512 X |
| 3,584,738 | 6/1971 | Wallace | 206/511 X |
| 3,756,383 | 9/1973 | Kryter | 206/387 |
| 3,830,363 | 8/1974 | Liber | 206/387 |
| 4,117,931 | 10/1978 | Berkman | 206/387 |

FOREIGN PATENT DOCUMENTS 1093869 12/1967 United Kingdom ..................... 206/456

*Primary Examiner*—Herbert F. Ross
*Attorney, Agent, or Firm*—Terryl K. Qualey

[57] ABSTRACT

A storage case for two different sizes of boxed video cassettes has a rectangular base and a complementary rectangular cover. Ribs formed on the interior of the side walls of the base define spaces for a plurality of one size of boxed video cassette between one pair of opposed side walls and spaces for a plurality of the other size between the other pair of opposed side walls. Ribs on the interior of the end wall of the base raise the lesser height cassette so that it extends the same distance above the base end wall as the cassette of greater height, whereby either cassette will fit closely under the end wall of the cover.

4 Claims, 4 Drawing Figures

STORAGE CASE

FIELD OF THE INVENTION

The present invention relates to a storage case for two different sizes of rectangular objects such as video tape cassettes.

BACKGROUND OF THE INVENTION

Video tape cassettes are presently available in two popular sizes for two different video recorder systems. The cassettes are sold in rectangular boxes having an area for labeling the contents of the cassette.

It is obviously desirable to have an attractive storage case that will hold a number of cassettes so that the cassettes can be kept on display where they will be easily accessible for use. From a manufacturing and sales viewpoint it is desirable to have one storage case that can store either size of video cassette. The manufacturer then only needs to make and the seller only needs to stock one type of storage case for users of both video recorder systems.

No storage case that will accommodate both sizes of video cassettes is believed to be presently available.

SUMMARY OF THE INVENTION

The present invention provides a storage case for two different sizes of rectangular objects such as boxed video cassettes. The storage case has a rectangular base and a complementary rectangular cover.

The base has a rectangular end wall and rectangular side walls extending generally perpendicularly from the end wall a distance less than the height of the rectangular object having the greater height. A first pair of opposed side walls are spaced at a distance generally equal to the length of a first of the rectangular objects and the second pair of opposed side walls are spaced a distance generally equal to the length of the second of the rectangular objects. A plurality of ribs extend from the interior of the base side walls, the length of the ribs running perpendicular to the base end wall and each rib being aligned with a rib on the opposed side wall. The ribs on a first pair of opposed base side walls are spaced apart a distance generally equal to the width of the first rectangular object and the ribs on the second pair of opposed side walls are spaced apart a distance generally equal to the width of the second rectangular object, each rib adjacent an end of a side wall being spaced from a plane connecting the free ends of the ribs on the adjacent side wall a distance equal to the spacing between said ribs on the side wall. A plurality of ribs extend from the interior of the base end wall a distance equal to the difference in height between the rectangular objects, the end wall ribs running between the opposed side wall ribs on the pair of opposed side walls spaced apart the length of the rectangular object having the greater height.

The cover has a rectangular end wall with generally the same dimensions as the base end wall and rectangular side walls extending generally perpendicularly from the cover end wall to align with the base side walls. The cover side walls extend from the cover end wall a distance equal to the difference between the height of the rectangular object having the greater height and the height of the base side walls. The edges of the cover side walls are formed to mate with the edges of the base side walls to position the cover on the base.

The ribs formed on the interior of the side walls of the base define spaces for a plurality of one size of rectangular object between one pair of opposed side walls and spaces for a plurality of the second size of rectangular object between the other pair of opposed side walls. The ribs on the interior of the base end wall raise the lesser height object so that it will extend the same distance above the base end wall as the object of greater height, whereby either object will fit closely under the end wall of the cover.

THE DRAWING

Figure 2:
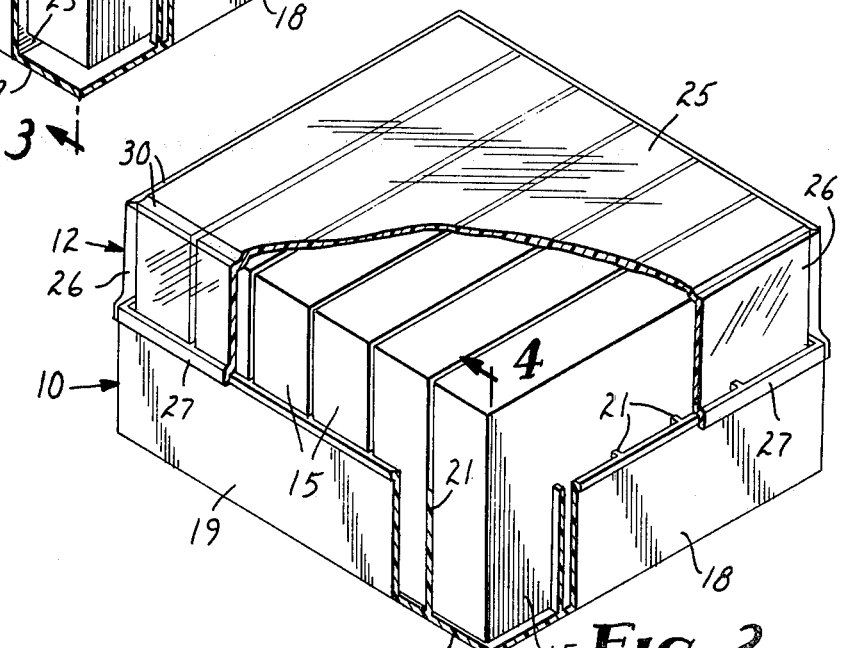
Figure 3:
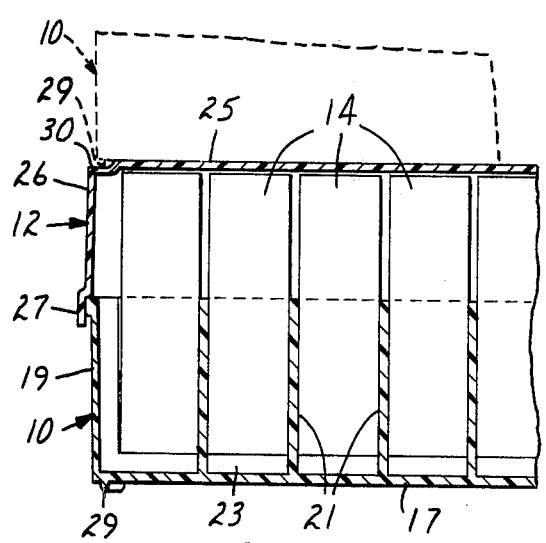
Figure 4:
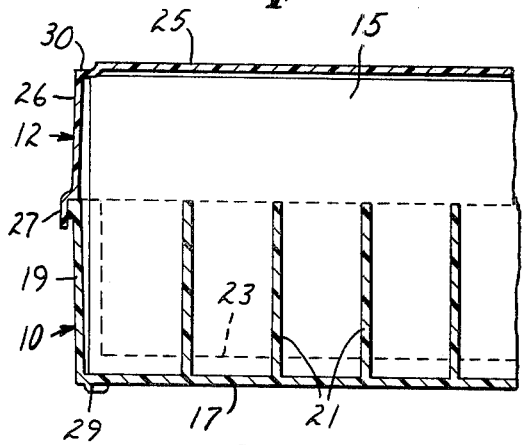

In the Drawing:

FIG. 1 is a perspective view, partially in section of a storage case constructed in accordance with the present invention containing one size of boxed video cassettes, FIG. 2 is a view similar to that of FIG. 1 with the storage case containing a second size of boxed video cassettes, FIG. 3 is a partial elevation view taken generally along line 3—3 of FIG. 1, and FIG. 4 is a partial elevation view similar to that of FIG. 3 taken generally along line 4—4 of FIG. 2.

The storage case of the present invention comprises a base 10 and a cover 12 which are preferably a molded plastic material, the base 10 being formed from an opaque material and the cover 12 being formed of a smoked transparent material so as to be attractive and permit reading of labels on boxed cassettes 14 or 15 within the case.

The base 10 is rectangular and has a rectangular end wall 17 and rectangular side walls 18 and 19. The side walls 18 and 19 extend generally perpendicularly from the end wall 17 a distance less than the height of the larger boxed cassette 15 and, as hereinafter described, the smaller boxed cassette 14 is raised to the same height above the end wall 17 as the larger boxed cassette 15 so that labels on the ends of the boxed cassettes 14 and 15 extend over the side walls 18 and 19 of the base 10. A first pair of opposed side walls 18 are spaced a distance generally equal to the length of the smaller boxed cassette 14 and the second pair of opposed side walls 19 are spaced a distance generally equal to the length of the larger boxed cassette 15.

A plurality of ribs 21 extend from the interior of the base side walls 18 and 19. The length of the ribs 21 run perpendicular to the base end wall 17 and each rib 21 is aligned with a rib on the opposed side wall. The ribs 21 on the first pair of opposed side walls 18 are spaced apart a distance generally equal to the width of the smaller boxed cassette 14 and the ribs on the second pair of opposed side walls 19 are spaced apart a distance generally equal to the width of the larger boxed cassette 15. Each rib 21 adjacent an end of a side wall 18 or 19 is spaced from a plane connecting the free ends of the ribs 21 on the adjacent side wall 19 or 18 a distance equal to the spacing between the ribs on the side wall 18 or 19.

A plurality of ribs 23 extend from the interior of the base end wall 17 a distance equal to the difference in height between the larger boxed cassette 15 and the smaller boxed cassette 14. The end wall ribs 23 run between the opposed side wall ribs 21 on the pair of opposed side walls 19 spaced apart the length of the boxed cassette 15 which has the greater height. The smaller boxed cassettes 14 when placed between the ribs 21 on side walls 18 thus sit on the end wall ribs 23 which raise the smaller cassettes 14 so that they extend the same distance above the base end wall 17 as the larger boxed cassettes 15 in their spaces between end wall ribs 23.

The cover 12 is rectangular and has a rectangular end wall 25 with generally the same dimensions as the base end wall 17. Rectangular side walls 26 extend generally perpendicularly from the cover end wall 25 to align with the base side walls 18 and 19. The cover side walls 26 extend from the cover end wall 25 a distance equal to the difference between the height of the boxed cassette 15 having the greater height and the height of the base side walls 18 and 19. A step 27 is formed at the edge of the cover side walls 26 around the cover on the outside of the cover side walls 26 so that the edges of the cover side walls 26 can rest on the edges of the base side walls 18 and 19 with the cover side wall step 27 extending around the base side walls 18 and 19 to position the cover 12 on the base 10.

To aid in stacking several cases, four feet 29 are formed on the outside of the base end wall 17, one foot being positioned at each corner of the base end wall 17. Each foot 29 is L shaped in cross-section and extends perpendicularly from the base end wall 17 with the legs of the L generally parallel to the base side walls 21 that are at the same corner of the end wall 17. A recess 30 is formed at the juncture of the cover end wall 25 and the cover side walls 26 around the cover end wall 25. The feet 29 on the base 10 fit in the cover recess 30 at the corners of the cover end wall 25. A plurality of the storage cases may thus be stacked with the feet 29 on the upper case fitting in the recess 30 on the case below it and bounding the cover end wall 25 to prevent the upper case from sliding off the lower case.

In use, a plurality of the smaller sized boxed cassettes 14 may be placed in the base 10 between the ribs 21 on the side walls 18. In this case the ribs 23 on the base wall 17 raise the cassettes 14 above the base wall 17 so that when the cover 12 is placed on the base 10 the boxed cassettes 14 fit close to the cover end wall 25. Alternatively, a plurality of the larger boxed cassettes 15 may be placed between the ribs 21 on the opposed side walls 19 and thus also between the ribs 23 on the base end wall 17 and when the cover 12 is placed on the base 10 the boxed cassettes 15 will fit close to the cover end wall 25.

We claim:

1. A storage case for two different sizes of rectangular objects, comprising:
    a rectangular base having a rectangular end wall and rectangular side walls extending generally perpendicularly from said end wall a distance less than the height of the rectangular object having the greater height, a first pair of opposed side walls being spaced a distance generally equal to the length of a first of the rectangular objects and the second pair of opposed side walls being spaced a distance generally equal to the length of the second of the rectangular objects,
    a plurality of ribs extending from the interior of said side walls, the length of said ribs running perpendicular to said end wall of said base and each rib being aligned with a rib on the opposed side wall, said ribs on the first pair of opposed side walls being spaced apart a distance generally equal to the width of the first rectangular object and said ribs on the second pair of opposed side walls being spaced apart a distance generally equal to the width of the second rectangular object, each rib adjacent an end of a said side wall being spaced from a plane connecting the free ends of the ribs on the adjacent side wall a distance equal to the spacing between said ribs on said side wall,
    a plurality of ribs extending from the interior of said end wall of said base a distance equal to the difference in height between the rectangular objects, said end wall ribs running between the opposed side wall ribs on the pair of opposed side walls spaced apart the length of the rectangular object having the greater height, and
    a rectangular cover having a rectangular end wall with generally the same dimensions as said base end wall and rectangular side walls extending generally perpendicularly from said cover end wall to align with said base side walls, said cover side walls extending from said cover end wall a distance equal to the difference between the height of the rectangular object having the greater height and the height of said base side walls, the edges of said cover side walls being formed to mate with the edges of said base side walls to position said cover on said base.

2. The storage case of claim 1 wherein said cover is transparent to permit the reading of labels on the rectangular objects within said storage case.

3. The storage case of claim 1 wherein to mate said cover side walls with said base side walls a step is formed at the edge of said cover side walls around said cover on the outside of said cover side walls whereby the edges of said cover side walls can rest on the edges of said base side walls with said cover side wall step extending around said base side walls to position said cover on said base.

4. The storage case of claim 1 wherein feet are formed on the outside of said base end wall, one at each corner of said base end wall, each said foot being L shaped in cross-section and extending perpendicularly from said base end wall with the legs of the L generally parallel to the base side walls that are at the same corner of said base end wall, and wherein a recess is formed on the outside of said cover at the juncture of said cover end wall and said cover side walls around said cover end wall to receive said feet on said base at the corners of said cover end wall, whereby a plurality of said storage cases may be stacked with the feet on an upper case bounding the cover end wall on the case below it to prevent the upper case from sliding off the lower case.

* * * * *